United States Patent
Parasher

(10) Patent No.: US 12,408,013 B2
(45) Date of Patent: Sep. 2, 2025

(54) APPARATUS AND METHOD FOR PROVIDING CENTRALIZED POLICY MANAGEMENT IN TELECOMMUNICATIONS SYSTEM

(71) Applicant: Rakuten Symphony, Inc., Tokyo (JP)

(72) Inventor: Sudhakar Parasher, Indore (IN)

(73) Assignee: RAKUTEN SYMPHONY, INC., Tokyo (JP)

( * ) Notice: Subject to any disclaimer, the term of this patent is extended or adjusted under 35 U.S.C. 154(b) by 0 days.

(21) Appl. No.: 17/802,579

(22) PCT Filed: Jun. 28, 2022

(86) PCT No.: PCT/US2022/035202
§ 371 (c)(1),
(2) Date: Aug. 26, 2022

(87) PCT Pub. No.: WO2024/005778
PCT Pub. Date: Jan. 4, 2024

(65) Prior Publication Data
US 2024/0196177 A1    Jun. 13, 2024

(51) Int. Cl.
*H04W 4/50* (2018.01)
*H04L 41/0894* (2022.01)
(Continued)

(52) U.S. Cl.
CPC .......... *H04W 4/50* (2018.02); *H04L 41/0894* (2022.05); *H04L 41/22* (2013.01); *H04W 24/02* (2013.01)

(58) Field of Classification Search
CPC . H04L 41/0894; H04L 41/0895; H04L 41/22; H04L 43/20; H04W 24/02; H04W 4/50
See application file for complete search history.

(56) References Cited

U.S. PATENT DOCUMENTS

| | | | |
|---|---|---|---|
| 2022/0053375 A1* | 2/2022 | Asawa | H04L 41/40 |
| 2022/0159525 A1* | 5/2022 | Chou | H04W 36/22 |

FOREIGN PATENT DOCUMENTS

| | | |
|---|---|---|
| WO | 2015/003125 A2 | 1/2015 |
| WO | 2022/089725 A1 | 5/2022 |

OTHER PUBLICATIONS

International Search Report dated Sep. 21, 2022 from the International Searching Authority in International Application No. PCT/US2022/035202.

(Continued)

*Primary Examiner* — Zhensheng Zhang
(74) *Attorney, Agent, or Firm* — Sughrue Mion, PLLC

(57) ABSTRACT

A method, performed by a centralized policy engine within a Service Management and Orchestration (SMO) framework of a telecommunications network, of managing policies for optimizing the telecommunications network is provided. The method includes: receiving, by the centralized policy engine, at least one policy, the at least one policy including a policy created by an application hosted in a radio access network (RAN) Intelligent Controller (RIC); receiving, by the centralized policy engine, data of one or more network functions, the data including at least one of performance data and event data of the one or more network functions; evaluating the at least one policy based on the received data; and controlling to implement one or more of the at least one policy in at least a RAN, based on the evaluating.

20 Claims, 8 Drawing Sheets

(51) Int. Cl.
*H04L 41/22* (2022.01)
*H04W 24/02* (2009.01)

(56) References Cited

OTHER PUBLICATIONS

Written Opinion dated Sep. 21, 2022 from the International Searching Authority in International Application No. PCT/US2022/035202.

* cited by examiner

APPARATUS AND METHOD FOR PROVIDING CENTRALIZED POLICY MANAGEMENT IN TELECOMMUNICATIONS SYSTEM

CROSS REFERENCE TO RELATED APPLICATIONS

This application is a National Stage of International Application No. PCT/US2022/035202, filed Jun. 28, 2022.

1. FIELD

Apparatuses and methods consistent with example embodiments of the present disclosure relate to a centralized policy engine for evaluating and controlling execution of policies in a telecommunications network, and more particularly to a centralized policy management within a Service Management and Orchestration (SMO) framework of a radio access network.

2. DESCRIPTION OF RELATED ART

A radio access network (RAN) is an important component in a telecommunications system, as it connects end-user devices (or user equipment) to other parts of the network. The RAN includes a combination of various network elements (NEs) that connect the end-user devices to a core network. Traditionally, hardware and/or software of a particular RAN is vendor specific.

Open RAN (O-RAN) technology has emerged to enable multiple vendors to provide hardware and/or software to a telecommunications system. To this end, O-RAN disaggregates the RAN functions into a centralized unit (CU), a distributed unit (DU), and a radio unit (RU). The CU is a logical node for hosting Radio Resource Control (RRC), Service Data Adaptation Protocol (SDAP), and/or Packet Data Convergence Protocol (PDCP) sublayers of the RAN. The DU is a logical node hosting Radio Link Control (RLC), Media Access Control (MAC), and Physical (PHY) sublayers of the RAN. The RU is a physical node that converts radio signals from antennas to digital signals that can be transmitted over the FrontHaul to a DU. Because these entities have open protocols and interfaces between them, they can be developed by different vendors.

FIGS. 1A and 1B illustrate a related art O-RAN architecture, and FIG. 2 illustrates a related art RAN Intelligent Controller (RIC) architecture. Referring to FIGS. 1A, 1B, and 2, RAN functions in the O-RAN architecture are controlled and optimized by a RIC. The RIC is a software-defined component that implements modular applications to facilitate the multivendor operability required in the O-RAN system, as well as to automate and optimize RAN operations. The RIC is divided into two types: a non-real-time RIC (NRT RIC) and a near-real-time RIC (nRT RIC).

The NRT RIC is the control point of a non-real-time control loop and operates on a timescale greater than 1 second within the Service Management and Orchestration (SMO) framework. Its functionalities are implemented through modular applications called rApps (rApp 1, . . . , rApp N in FIG. 1A), and include: providing policy based guidance and enrichment across the A1 interface, which is the interface that enables communication between the NRT RIC and the nRT RIC; performing data analytics; Artificial Intelligence/Machine Learning (AI/ML) training and inference for RAN optimization; and/or recommending configuration management actions over the O1 interface, which is the interface that connects the SMO to RAN managed elements (e.g., nRT RIC, O-RAN Centralized Unit (O-CU), O-RAN Distributed Unit (O-DU), etc.).

The nRT RIC operates on a timescale between 10 milliseconds and 1 second and connects to the O-DU, O-CU (disaggregated into the O-CU control plane (O-CU-CP) and the O-CU user plane (O-CU-UP)), and an open evolved NodeB (O-eNB) via the E2 interface. The nRT RIC uses the E2 interface to control the underlying RAN elements (E2 nodes/network functions (NFs)) over a near-real-time control loop. The nRT RIC monitors, suspends/stops, overrides, and controls the E2 nodes (O-CU, O-DU, and O-eNB) via policies. For example, the nRT sets policy parameters on activated functions of the E2 nodes. Further, the nRT RIC hosts xApps to implement functions such as quality of service (QOS) optimization, mobility optimization, slicing optimization, interference mitigation, load balancing, security, etc. The two types of RICs work together to optimize the O-RAN. For example, the NRT RIC provides, over the A1 interface, the policies, data, and AI/ML models enforced and used by the nRT RIC for RAN optimization, and the nRT returns policy feedback (i.e., how the policy set by the NRT RIC works).

The SMO framework, within which the NRT RIC is located, manages and orchestrates RAN elements. Specifically, the SMO manages and orchestrates what is referred to as the O-Ran Cloud (O-Cloud). The O-Cloud is a collection of physical RAN nodes that host the RICs, O-CUs, and O-DUs, the supporting software components (e.g., the operating systems and runtime environments), and the SMO itself. In other words, the SMO manages the O-Cloud from within. The O2 interface is the interface between the SMO and the O-Cloud it resides in. Through the O2 interface, the SMO provides infrastructure management services (IMS) and deployment management services (DMS).

In the related art O-RAN architecture described above, policy computation is performed by the rApps and used only to enrich the A1 interface toward the nRT RIC based on metrics data collected over the O1 interface. In this approach, however, the A1 interface is mandatory for rApp-based policies to be implemented, and the nRT RIC is required for consumption of the policies sent over the A1 interface. Further, in the related art approach, there is no policy evaluation for the policy provided by the rApps for complex use cases before applying in production networks, which can break the network and cause outages. The related art architecture lacks the flexibility to control and manage policies created by third party rApps, and does not allow for imperative policy management to be at the SMO or management level.

SUMMARY

Aspects of one or more embodiments provide centralized policy management in the Service Management and Orchestration (SMO) framework of both user-defined policies and policies computed by third party rApps, thereby improving the scalability and flexibility of the network architecture.

Aspects of one or more embodiments provide centralized control over imperative policy implementation via the O1 interface by performing policy evaluation and correlation, before trigger of action, for both user-defined policies and those from third party rApps in a centralized correlation and policy engine (CPE) within the SMO framework.

According to one or more embodiments, a method, performed by a centralized policy engine within a Service Management and Orchestration (SMO) framework of a telecommunications network, of managing policies, includes: receiving, by the centralized policy engine, at least one policy, the at least one policy including a policy created by an application hosted in a radio access network (RAN) Intelligent Controller (RIC); receiving, by the centralized policy engine, data of one or more network functions, the data including at least one of performance data and event data of the one or more network functions; evaluating the at least one policy based on the received data; and controlling to implement one or more of the at least one policy in at least a RAN, based on the evaluating.

The at least one policy may further include a user-defined policy input to the centralized policy engine via a user interface.

The policy created by the application may be for configuring at least one RAN node, and the user-defined policy may be correlated to the policy created by the application and may be for configuring at least one of a transport network function and a core network function.

The RIC may be a non-real-time (NRT) RIC and the application may be an rApp hosted by the NRT RIC.

The receiving the data may include receiving real time performance and/or event data of the one or more network functions from an observability framework (OBF) of the SMO framework.

The real time performance and/or event data may include fault, configuration, accounting, performance and security (FCAPS) data from E2 RAN nodes and at least one of a transport network and a core network.

The evaluating may include determining the one or more policies to implement by performing analysis, computations, enrichment and evaluation with respect to the at least one policy and the received data.

The controlling to implement the one or more policies may include triggering a life cycle management workflow in an orchestrator of the SMO framework, to trigger a configuration manager to implement the one or more policies on at least the RAN.

According to one or more embodiments, an apparatus for implementing a centralized policy engine within a Service Management and Orchestration (SMO) framework of a telecommunications network, includes: a memory storing instructions; and at least one processor within the SMO framework and distinct from a radio access network (RAN) Intelligent Controller (RIC) in the SMO framework, the at least one processor configured to execute the instructions to: receive at least one policy, the at least one policy including a policy created by an application hosted in the RIC; receive data of one or more network functions, the data including at least one of performance data and event data of the one or more network functions; evaluate the at least one policy based on the received data; and control to implement one or more of the at least one policy in at least a RAN, based on the evaluating.

The at least one policy may further include a user-defined policy input to the centralized policy engine via a user interface.

The policy created by the application may be for configuring at least one RAN node, and the user-defined policy may be correlated to the policy created by the application and may be for configuring at least one of a transport network function and a core network function.

The RIC may be a non-real-time (NRT) RIC and the application may be an rApp hosted by the NRT RIC.

The at least one processor may be configured to execute the instructions to receive real time performance and/or event data of the one or more network functions from an observability framework (OBF) of the SMO framework.

The real time performance and/or event data may include fault, configuration, accounting, performance and security (FCAPS) data from E2 RAN nodes and at least one of a transport network and a core network.

The at least one processor may be configured to execute the instructions to determine the one or more policies to implement by performing analysis, computations, enrichment and evaluation with respect to the at least one policy and the received data.

The at least one processor may be configured to execute the instructions to control to implement the one or more policies by triggering a life cycle management workflow in an orchestrator of the SMO framework, to trigger a configuration manager to implement the one or more policies on at least the RAN.

A non-transitory computer-readable recording medium has recorded thereon instructions executable by at least one processor, of a centralized policy engine within a Service Management and Orchestration (SMO) framework of a telecommunications network, to perform a method of managing policies, the method including: receiving, by the centralized policy engine, at least one policy, the at least one policy including a policy created by an application hosted in a radio access network (RAN) Intelligent Controller (RIC); receiving, by the centralized policy engine, data of one or more network functions, the data including at least one of performance data and event data of the one or more network functions; evaluating the at least one policy based on the received data; and controlling to implement one or more of the at least one policy in at least a RAN, based on the evaluation.

The at least one policy may further include a user-defined policy input to the centralized policy engine via a user interface.

The policy created by the application may be for configuring at least one RAN node, and the user-defined policy may be correlated to the policy created by the application and may be for configuring at least one of a transport network function and a core network function.

The RIC may be a non-real-time (NRT) RIC and the application may be an rApp hosted by the NRT RIC.

The receiving the data may include receiving real time performance and/or event data of the one or more network functions from an observability framework (OBF) of the SMO framework.

The real time performance and/or event data may include fault, configuration, accounting, performance and security (FCAPS) data from E2 RAN nodes and at least one of a transport network and a core network.

The evaluating may include determining the one or more policies to implement by performing analysis, computations, enrichment and evaluation with respect to the at least one policy and the received data.

The controlling to implement the one or more policies may include triggering a life cycle management workflow in an orchestrator of the SMO framework, to trigger a configuration manager to implement the one or more policies on at least the RAN.

Additional aspects will be set forth in part in the description that follows and, in part, will be apparent from the description, or may be realized by practice of the presented embodiments of the disclosure.

BRIEF DESCRIPTION OF THE DRAWINGS

Aspects, features, and advantages of certain exemplary embodiments of the disclosure will be described below with reference to the accompanying drawings, in which like reference numerals denote like elements, and wherein.

DETAILED DESCRIPTION

Figure 1A:
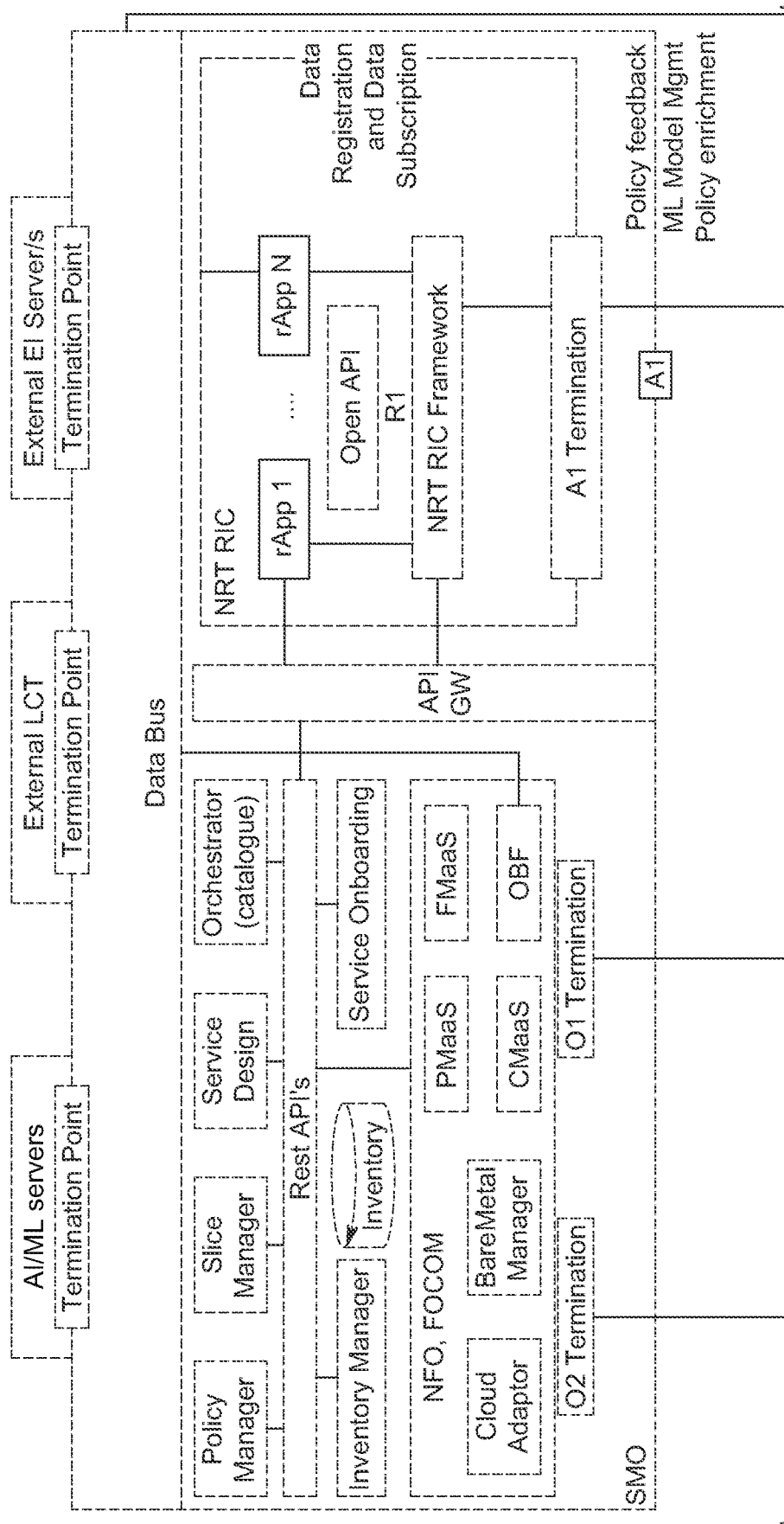
FIGS. 1A and 1B illustrate an O-RAN architecture in the related art.
Figure 1B:
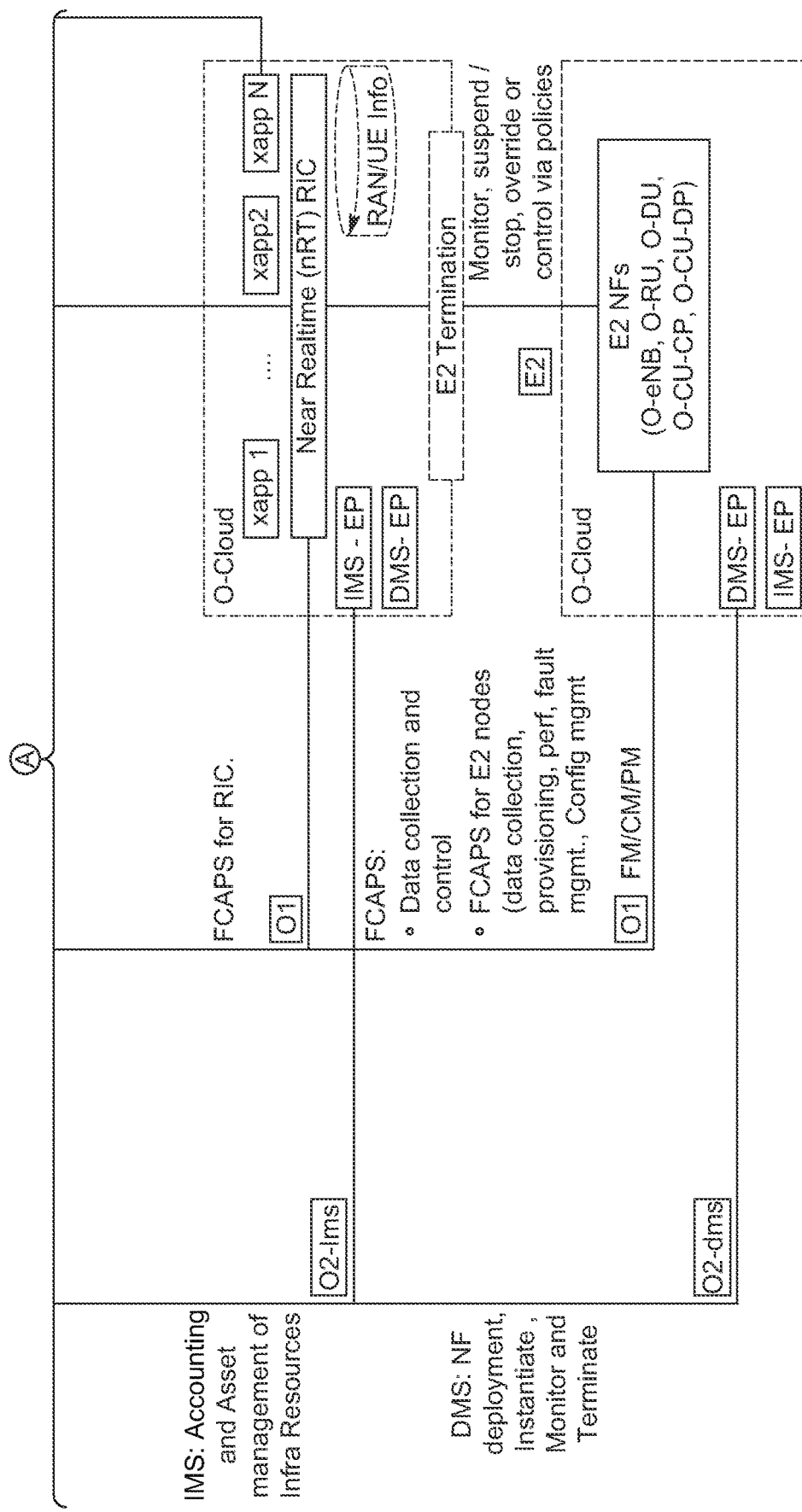
Figure 2:
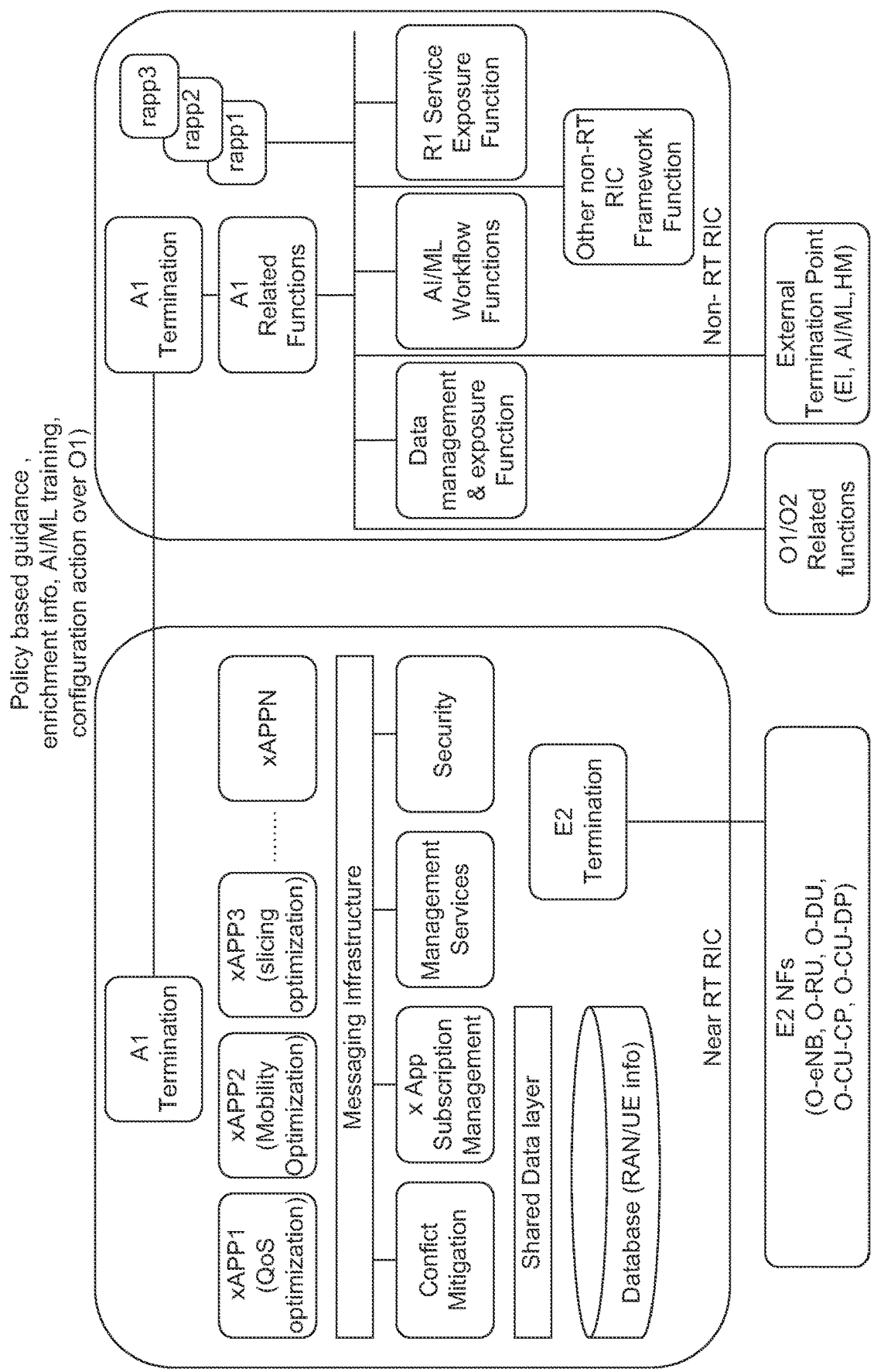
FIG. 2 illustrates a RAN Intelligent Controller (RIC) architecture in the related art.

The following detailed description of example embodiments refers to the accompanying drawings. The same reference numbers in different drawings may identify the same or similar elements.

The foregoing disclosure provides illustration and description, but is not intended to be exhaustive or to limit the implementations to the precise form disclosed. Modifications and variations are possible in light of the above disclosure or may be acquired from practice of the implementations. Further, one or more features or components of one embodiment may be incorporated into or combined with another embodiment (or one or more features of another embodiment). Additionally, in the flowcharts and descriptions of operations provided below, it is understood that one or more operations may be omitted, one or more operations may be added, one or more operations may be performed simultaneously (at least in part), and the order of one or more operations may be switched.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code. It is understood that software and hardware may be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Where only one item is intended, the term "one" or similar language is used. Also, as used herein, the terms "has," "have," "having," "include," "including," or the like are intended to be open-ended terms. Further, the phrase "based on" is intended to mean "based, at least in part, on" unless explicitly stated otherwise. Furthermore, expressions such as "at least one of [A] and [B]" or "at least one of [A] or [B]" are to be understood as including only A, only B, or both A and B.

As set forth above, in the related art O-RAN architecture, policies generated by rApps are managed and executed in the radio access network (RAN) Intelligent Controller (RIC). That is, policy computation performed by the rApps in the non-real-time (NRT) RIC is used only to enrich the A1 interface toward the near-real-time (nRT) RIC. As a result, the nRT RIC is required for consumption of the policies, there is no policy evaluation for the policies provided by the rApps (particularly for complex use cases) before applying in production networks, and there lacks flexibility to control and manage policies created by third party rApps.

Example embodiments provide a novel Service Management and Orchestration (SMO) architecture that includes a correlation and policy engine (CPE) to centralize policy management for both rApp-based policies and user-defined policies. This centralized policy management can therefore control imperative policy implementation by providing policy evaluation and correlation before trigger of actions, thereby minimizing the risk of any network disturbances as compared to the declarative policies on the E2 nodes in the related art.

Further, the CPE according to example embodiments stores and maintains all policies, thereby mitigating or altogether avoiding data duplication across rApp-based policies and user-defined policies.

Additionally, the centralized CPE according to example embodiments can evaluate metrics and fault, configuration, accounting, performance and security (FCAPS) data from the Infrastructure and all sub-domains (RAN, transport, and core) to provide correlation between policies defined for E2 nodes and those of other sub-domains (transport and core). Here, the Infrastructure includes both the physical nodes (including the supporting software components (e.g., OS, Virtual Machine Monitor, Container Runtime, etc.)) and the virtualized nodes hosted by the physical nodes/servers/clusters/data centers/etc. As a result, generated policies can be more complete and achieve end to end network performance optimization. By centralizing policy management in the SMO, example embodiments provide a single framework for orchestration and life cycle management (LCM) for network functions (or nodes) and network slices.

Figure 3:
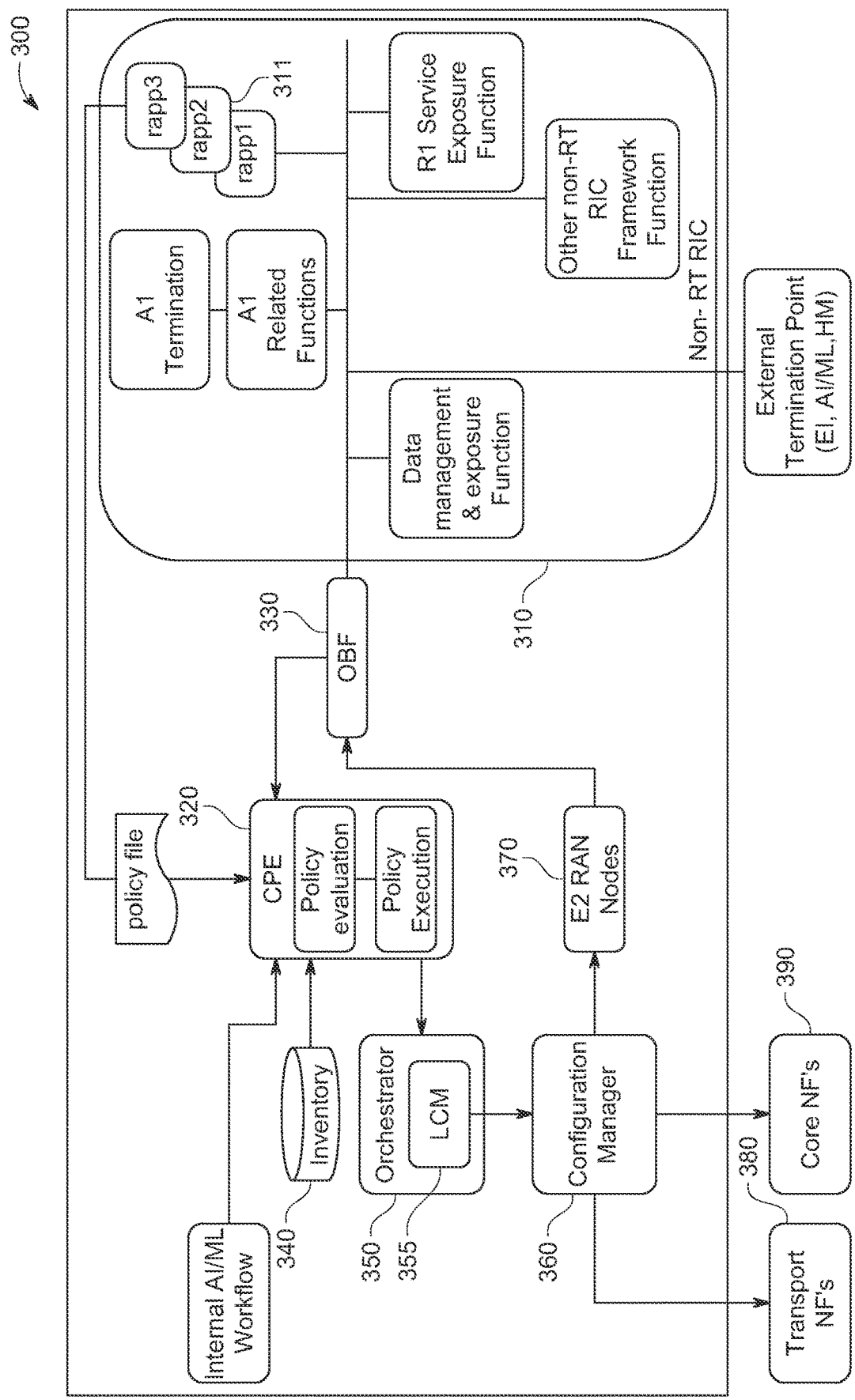
FIG. 3 illustrates a block diagram of a Service Management and Orchestration (SMO) architecture in accordance with one or more embodiments.

FIG. 3 illustrates a Service Management and Orchestration (SMO) architecture 300 in accordance with one or more embodiments. Referring to FIG. 3, the SMO architecture in accordance with an example embodiment includes a NRT RIC 310, a correlation and policy engine 320, an observability framework 330, an inventory 340, an orchestrator 350, a configuration manager 360, and E2 RAN nodes 370. (O-CU, O-DU, and O-eNB).

The NRT RIC 310 is the control point of a non-real-time control loop within the SMO framework. The NRT RIC 310 may or may not be connected to a nRT RIC in various embodiments (e.g., a nRT RIC may be absent in the system architecture). The NRT RIC 310 hosts a plurality of microservices or modular applications called rApps 311. The rApps 311 may be provided by different third parties and configured to create policies to optimize network performance based on certain input parameters, e.g., to optimize quality of service (QOS) (e.g., a policy to prioritize a certain QoS based on network behavior or other input parameters), to optimize mobility, to optimize network slicing, to mitigate interference, to improve load balancing (e.g., a policy to steer traffic based on network traffic data, number of active devices, etc.), etc. By way of non-limiting example, a user policy (e.g., P1) is applicable for a set of domains (e.g., a radio access network (RAN), Core, etc.) and a location (e.g., Tokyo, Kanagawa, and Nagoya). The policies may be for handling complex use cases based on one or more input data sources such as enrichment information (EI) (i.e., any extra information from the network or non-network sources that may be used to improve performance in the RAN (or other sub-domain, including transport and core), such as network/area wide information, traffic patterns, load patterns, weather information, weather forecasts, event information, etc.), Artificial Intelligence/Machine Learning model inferences, etc. That is, the rApps may process metric data collected over the O1 interface or inputs from other sources (e.g., EI, AI/ML, etc.), and policy files (e.g., in JSON policy format) accordingly. The policies generated by the rApps may be for implementation in the RAN, i.e., by the E2 nodes.

The CPE 320 is configured to evaluate and execute (i.e., trigger implementation) policies created by the rApps and by users. The inputs to the CPE 320 include a policy (e.g., policy file created by rApp or a policy created/input by a user via a user interface displayed on a client terminal) and may further include real time performance and event data from the E2 nodes via the OBF 330 and data from the inventory 340 (e.g., data about all the network components and elements, connection between different network elements, including telemetry data about these network elements, etc.). Based on these inputs, the CPE 320 analyzes and evaluates the policy and then triggers the policy implementation to be performed by the configuration manager 360 over the O1 interface to the E2 RAN nodes 370, over an interface to transport network functions (NFs) 380, and/or over an interface to core NFs 390.

Specifically, the policy evaluation in the CPE 320 may receive real time performance and event data inputs (e.g., real time metrics and performance data via the OBF 330, EI received from the NRT RIC 310 or elsewhere, etc.), analyze, compute, enrich (e.g., improving the details of the event by considering data from other sources) and evaluate by applying analytics such as AI/ML, and then trigger an action based on a matched policy (i.e., a policy determined from among plural available policies). To this end, the policy execution in the CPE 320 may take a decision to trigger a life cycle management (LCM) work flow 355 in the orchestrator 350, which further triggers the configuration manager 360 to implement the policy (e.g., change configuration parameters on the E2 nodes 370 over the O1 interface, the transport NFs 380, and/or the core NFs 390).

In accordance with example embodiments, the CPE 320 is configured to allow users to define policies. For example, the CPE 320 or another component of the system may deploy an application (e.g., microservice, cloud-based application, etc.) to receive user inputs to a user interface displayed on a client terminal for defining a user-based policy. The user-based policy may be for the transport and core sub-domains. By way of example, if an rApp policy implemented in the RAN impacts cross-domain performance (or may be impacted by cross-domain performance), the CPE 320 allows a user to define policies correlated to the rApp policy, i.e., to change or optimize cross-domain parameters and thereby achieve end to end network performance optimization.

Figure 4:
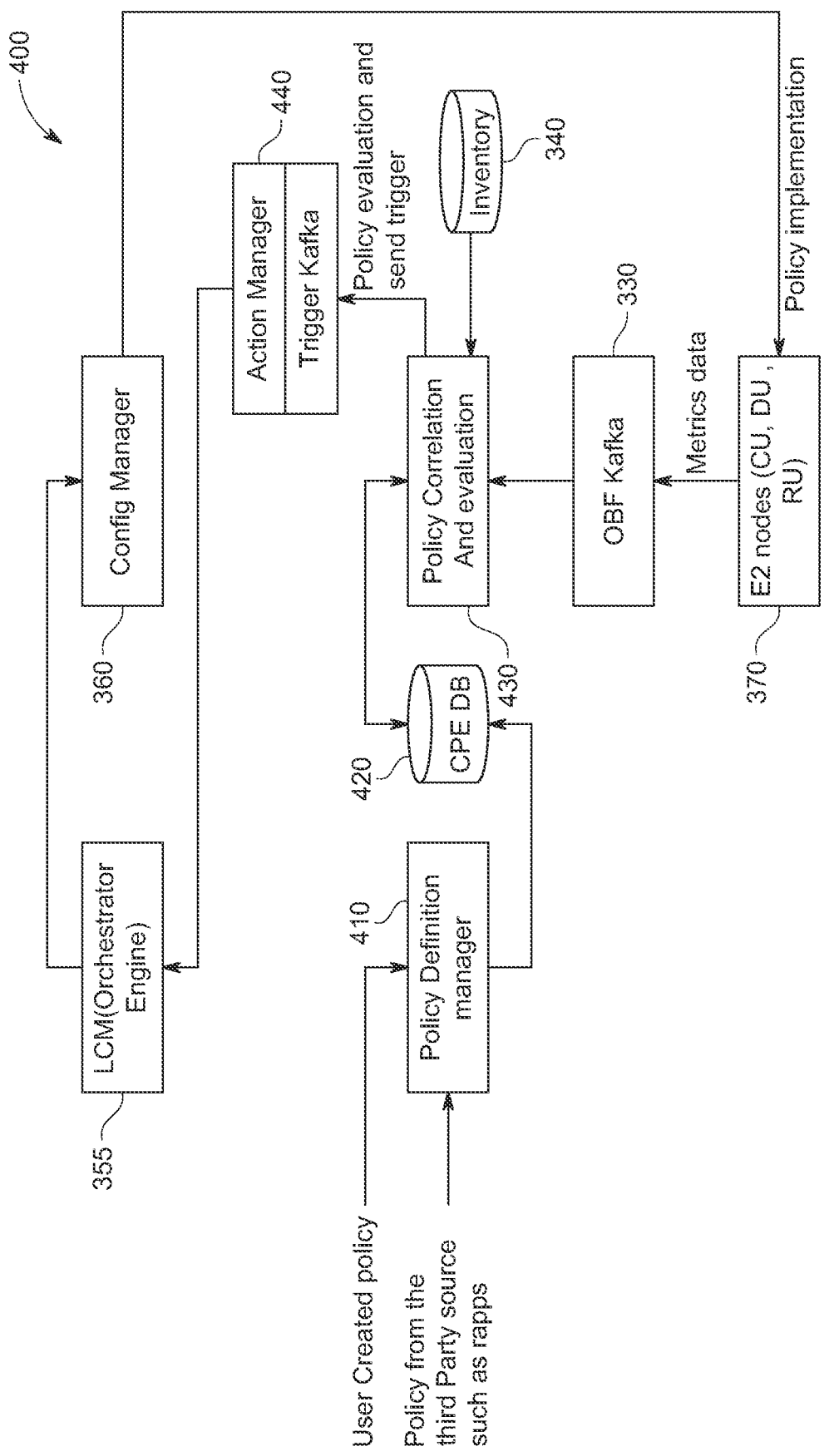
FIG. 4 illustrates a block diagram of a centralized policy management system architecture according in accordance with one or more embodiments.

FIG. 4 illustrates a block diagram of a centralized policy management system workflow according in accordance with one or more embodiments.

Referring to FIG. 4, a policy definition manager 410 is configured to receive policies from third party sources such as rApps and user-created policies. The policy definition manager 410 may provide a user interface displayable on a client terminal to receive definitions of a policy input by a user. The policies received in the policy definition manager may be stored in a database 420 of the CPE 320. The policies may be in JSON format and stored as JSON policy files. As set forth above, the rApp based policies may be for complex use cases and for implementation in (i.e., configuring) E2 nodes 370, while the user-created policies may be correlating policies for the other sub-domains (the user-created policies may also include policies for configuring the E2 nodes 370). The E2 nodes 370 are RAN network functions including O-CUs (logically split into O-CU-CP and O-CU-UP), O-DUs, O-RUs, and O-eNBs (if included in the network).

The OBF 330 meanwhile may receive real time metrics, performance, and event data from the E2 nodes and provide this data to a policy correlation and evaluation function 430 of the CPE 320. Here, the input data may be provided as real time data streams, e.g., Kafka streams, to the CPE 320.

The policy correlation and evaluation function 430 in the CPE 320 receives the real time performance and event data inputs (e.g., real time metrics and performance data via the OBF 330, EI received from the NRT RIC 310 or elsewhere, etc.), analyzes, computes, enriches and evaluates by applying analytics such as AI/ML, and then triggers an action based on a matched policy or policies. The policy correlation and evaluation function 430 may trigger an action based on a matched policy via a Kafka stream to an action manager 440.

The action manager 440 of the CPE 320 may then trigger a LCM workflow 355 in accordance with the policy, which in turn triggers the configuration manager 360 to implement the policy (e.g., change configuration parameters on the E2 nodes 370 over the O1 interface, the transport NFs 380, and/or the core NFs 390). The policy implementation may be performed on the E2 nodes 370, transport NFs 380, and/or core NFs 390, e.g., over Netconf protocol to any of the above.

Figure 5:
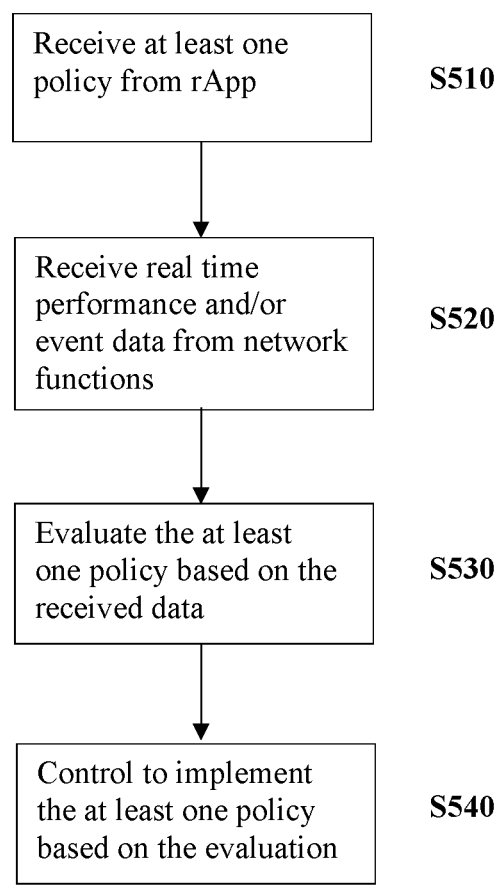
FIG. 5 illustrates a flowchart of a method of managing a policy in a centralized policy engine within an SMO framework, in accordance with one or more embodiments.

FIG. 5 illustrates a flowchart of a method of managing a policy in a centralized policy engine within an SMO framework, in accordance with one or more embodiments.

Referring to FIG. 5, at operation S510, at least one policy is received by the centralized policy engine. The at least one policy may include at least one of a policy created by an rApp hosted by a NRT RIC and a user-defined policy. The rApp-based policy may be for configuring RAN node (E2 nodes) and the user-created policies may be for configuring transport and/or core network functions.

At operation S520, real time performance and/or event data is received by the centralized policy engine from RAN nodes (i.e., E2 nodes). As set forth above, the real time performance and/or event data (e.g., metrics, FCAPS data, etc.) may be received from an OBF of the SMO as real time data streams, e.g., Kafka streams. The centralized policy engine may also receive performance data from other sub-domains.

At operation S530, the centralized policy engine evaluates the at least one policy based on the received data. To this end, the centralized policy engine may perform analysis, computations, enrichment and evaluation by applying analytics such as AI/ML. The centralized policy engine may determine one or more policies to implement (e.g., correlated policies across each of the sub-domains) based on the evaluation.

At operation S540, the centralized policy engine controls to implement the at least one policy based on the evaluation. Specifically, the centralized policy engine may trigger an LCM workflow in an orchestrator of the SMO, which in turn triggers a configuration manager of the SMO to implement the at least one policy in at least one of RAN nodes, the transport network, and the core network.

The centralized policy engine according to example embodiments controls imperative policy implementation by providing policy evaluation and correlation before trigger of actions, thereby minimizing the risk of any network disturbances as compared to the declarative policies on the E2 nodes in the related art. Further, the centralized policy engine according to example embodiments evaluates performance and event data across multiple sub-domains (RAN, transport, and core) to provide more complete policies that achieve end to end network performance optimization.

Figure 6:
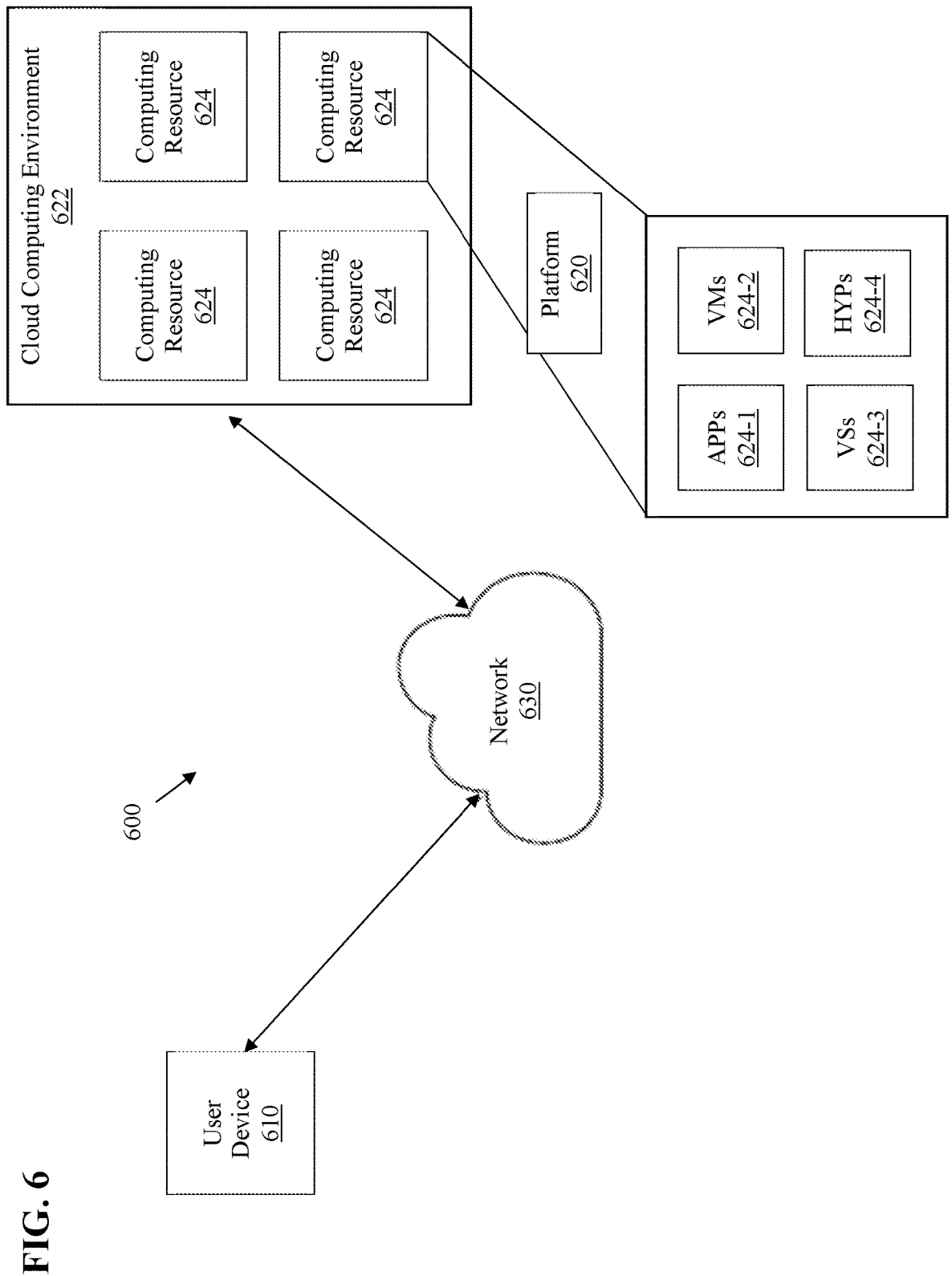
FIG. 6 is a diagram of an example environment in which systems and/or methods, described herein, may be implemented.

FIG. 6 is a diagram of an example environment 600 in which systems and/or methods, described herein, may be implemented. As shown in FIG. 6, environment 600 may include a user device 610, a platform 620, and a network 630. Devices of environment 600 may interconnect via wired connections, wireless connections, or a combination of wired and wireless connections. In embodiments, any of the functions and operations described with reference to FIGS. 3 through 5 above may be performed by any combination of elements illustrated in FIG. 6.

User device 610 includes one or more devices capable of receiving, generating, storing, processing, and/or providing information associated with platform 620. For example, user device 610 may include a computing device (e.g., a desktop computer, a laptop computer, a tablet computer, a handheld computer, a smart speaker, a server, etc.), a mobile phone (e.g., a smart phone, a radiotelephone, etc.), a wearable device (e.g., a pair of smart glasses or a smart watch), or a similar device. In some implementations, user device 610 may receive information from and/or transmit information to platform 620.

Platform 620 includes one or more devices capable of receiving, generating, storing, processing, and/or providing information. In some implementations, platform 620 may include a cloud server or a group of cloud servers. In some implementations, platform 620 may be designed to be modular such that certain software components may be swapped in or out depending on a particular need. As such, platform 620 may be easily and/or quickly reconfigured for different uses.

In some implementations, as shown, platform 620 may be hosted in cloud computing environment 622. Notably, while implementations described herein describe platform 620 as being hosted in cloud computing environment 622, in some implementations, platform 620 may not be cloud-based (i.e., may be implemented outside of a cloud computing environment) or may be partially cloud-based.

Cloud computing environment 622 includes an environment that hosts platform 620. Cloud computing environment 622 may provide computation, software, data access, storage, etc., services that do not require end-user (e.g., user device 610) knowledge of a physical location and configuration of system(s) and/or device(s) that hosts platform 620. As shown, cloud computing environment 622 may include a group of computing resources 624 (referred to collectively as "computing resources 624" and individually as "computing resource 624").

Computing resource 624 includes one or more personal computers, a cluster of computing devices, workstation computers, server devices, or other types of computation and/or communication devices. In some implementations, computing resource 624 may host platform 620. The cloud resources may include compute instances executing in computing resource 624, storage devices provided in computing resource 624, data transfer devices provided by computing resource 624, etc. In some implementations, computing resource 624 may communicate with other computing resources 624 via wired connections, wireless connections, or a combination of wired and wireless connections.

As further shown in FIG. 6, computing resource 624 includes a group of cloud resources, such as one or more applications ("APPs") 624-1, one or more virtual machines ("VMs") 624-2, virtualized storage ("VSs") 624-3, one or more hypervisors ("HYPs") 624-4, or the like.

Application 624-1 includes one or more software applications that may be provided to or accessed by user device 610. Application 624-1 may eliminate a need to install and execute the software applications on user device 610. For example, application 624-1 may include software associated with platform 620 and/or any other software capable of being provided via cloud computing environment 622. In some implementations, one application 624-1 may send/receive information to/from one or more other applications 624-1, via virtual machine 624-2.

Virtual machine 624-2 includes a software implementation of a machine (e.g., a computer) that executes programs like a physical machine. Virtual machine 624-2 may be either a system virtual machine or a process virtual machine, depending upon use and degree of correspondence to any real machine by virtual machine 624-2. A system virtual machine may provide a complete system platform that supports execution of a complete operating system ("OS"). A process virtual machine may execute a single program, and may support a single process. In some implementations, virtual machine 624-2 may execute on behalf of a user (e.g., user device 610), and may manage infrastructure of cloud computing environment 622, such as data management, synchronization, or long-duration data transfers.

Virtualized storage 624-3 includes one or more storage systems and/or one or more devices that use virtualization techniques within the storage systems or devices of computing resource 624. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 624-4 may provide hardware virtualization techniques that allow multiple operating systems (e.g., "guest operating systems") to execute concurrently on a host computer, such as computing resource 624. Hypervisor 624-4 may present a virtual operating platform to the guest operating systems, and may manage the execution of the guest operating systems. Multiple instances of a variety of operating systems may share virtualized hardware resources.

Network 630 includes one or more wired and/or wireless networks. For example, network 630 may include a cellular network (e.g., a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, or the like, and/or a combination of these or other types of networks.

The number and arrangement of devices and networks shown in FIG. 6 are provided as an example. In practice, there may be additional devices and/or networks, fewer devices and/or networks, different devices and/or networks, or differently arranged devices and/or networks than those shown in FIG. 6. Furthermore, two or more devices shown in FIG. 6 may be implemented within a single device, or a single device shown in FIG. 6 may be implemented as multiple, distributed devices. Additionally, or alternatively, a set of devices (e.g., one or more devices) of environment 600 may perform one or more functions described as being performed by another set of devices of environment 600.

Figure 7:
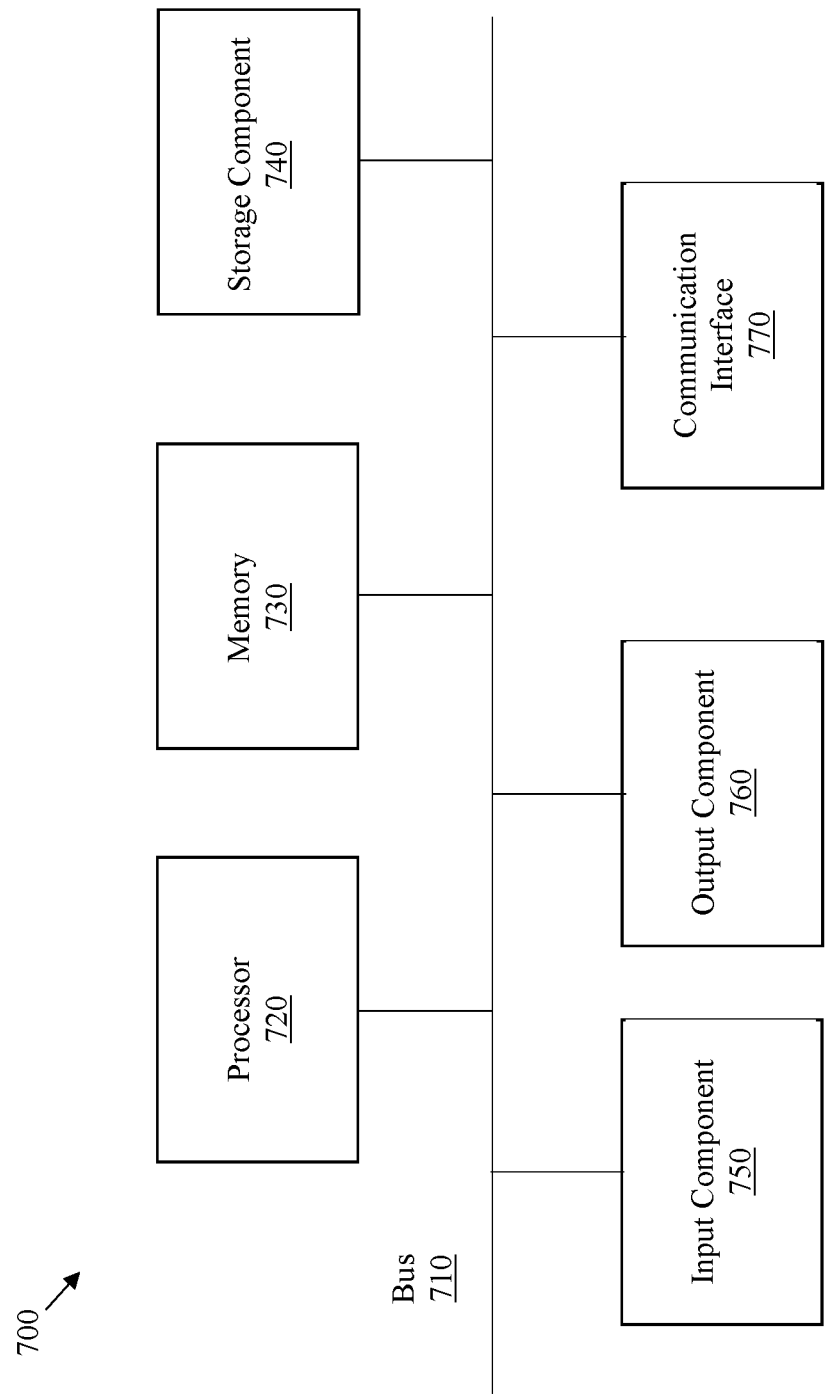
FIG. 7 is a diagram of example components of a device according to an embodiment.

FIG. 7 is a diagram of example components of a device 700. Device 700 may correspond to user device 610 and/or platform 620. As shown in FIG. 7, device 700 may include a bus 710, a processor 720, a memory 730, a storage component 740, an input component 750, an output component 760, and a communication interface 770.

Bus 710 includes a component that permits communication among the components of device 700. Processor 720 may be implemented in hardware, firmware, or a combination of hardware and software. Processor 720 may be a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 720 includes one or more processors capable of being programmed to perform a function. Memory 730 includes a random access memory (RAM), a read only memory (ROM), and/or another type of dynamic or static storage device (e.g., a flash memory, a magnetic memory, and/or an optical memory) that stores information and/or instructions for use by processor 720.

Storage component 740 stores information and/or software related to the operation and use of device 700. For example, storage component 740 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive. Input component 750 includes a component that permits device 700 to receive information, such as via user input (e.g., a touch screen display, a keyboard, a keypad, a mouse, a button, a switch, and/or a microphone). Additionally, or alternatively, input component 750 may include a sensor for sensing information (e.g., a global positioning system (GPS) component, an accelerometer, a gyroscope, and/or an actuator). Output component 760 includes a component that provides output information from device 700 (e.g., a display, a speaker, and/or one or more light-emitting diodes (LEDs)).

Communication interface 770 includes a transceiver-like component (e.g., a transceiver and/or a separate receiver and transmitter) that enables device 700 to communicate with other devices, such as via a wired connection, a wireless connection, or a combination of wired and wireless connections. Communication interface 770 may permit device 700 to receive information from another device and/or provide information to another device. For example, communication interface 770 may include an Ethernet interface, an optical interface, a coaxial interface, an infrared interface, a radio frequency (RF) interface, a universal serial bus (USB) interface, a Wi-Fi interface, a cellular network interface, or the like.

Device 700 may perform one or more processes described herein. Device 700 may perform these processes in response to processor 720 executing software instructions stored by a non-transitory computer-readable medium, such as memory 730 and/or storage component 740. A computer-readable medium is defined herein as a non-transitory memory device. A memory device includes memory space within a single physical storage device or memory space spread across multiple physical storage devices.

Software instructions may be read into memory 730 and/or storage component 740 from another computer-readable medium or from another device via communication interface 770. When executed, software instructions stored in memory 730 and/or storage component 740 may cause processor 720 to perform one or more processes described herein.

Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 7 are provided as an example. In practice, device 700 may include additional components, fewer components, different components, or differently arranged components than those shown in FIG. 7. Additionally, or alternatively, a set of components (e.g., one or more components) of device 700 may perform one or more functions described as being performed by another set of components of device 700.

In embodiments, any one of the operations or processes of FIGS. 3 through 5 may be implemented by or using any one of the elements illustrated in FIGS. 6 and 7.

The foregoing disclosure provides illustration and description, but is not intended to be exhaustive or to limit the implementations to the precise form disclosed. Modifications and variations are possible in light of the above disclosure or may be acquired from practice of the implementations.

Some embodiments may relate to a system, a method, and/or a computer readable medium at any possible technical detail level of integration. Further, one or more of the above components described above may be implemented as instructions stored on a computer readable medium and executable by at least one processor (and/or may include at least one processor). The computer readable medium may include a computer-readable non-transitory storage medium (or media) having computer readable program instructions thereon for causing a processor to carry out operations.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program code/instructions for carrying out operations may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects or operations.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer readable media according to various embodiments. In this regard, each block in the flowchart or block diagrams may represent a module, segment, or portion of instructions, which comprises one or more executable instructions for implementing the specified logical function(s). The method, computer system, and computer readable medium may include additional blocks, fewer blocks, different blocks, or differently arranged blocks than those depicted in the Figures. In some alternative implementations, the functions noted in the blocks may occur out of the order noted in the Figures. For example, two blocks shown in succession may, in fact, be executed concurrently or substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

What is claimed is:

1. A method, performed by a centralized policy engine within a Service Management and Orchestration (SMO) framework of a telecommunications network, of managing policies, the method comprising:

receiving, by the centralized policy engine, at least one policy, the at least one policy comprising a policy created by an application hosted in a radio access network (RAN) Intelligent Controller (RIC), the centralized policy engine within the SMO framework being distinct from a Non-Real-Time RIC and a Near-Real-Time RIC;

receiving, by the centralized policy engine, data of one or more network functions, the data comprising at least one of performance data and event data of the one or more network functions;

evaluating the at least one policy based on the received data; and controlling to implement one or more of the at least one policy in at least a RAN, based on the evaluating.

2. The method as claimed in claim 1, wherein the at least one policy further comprises a user-defined policy input to the centralized policy engine via a user interface.

3. The method as claimed in claim 2, wherein the policy created by the application is for configuring at least one RAN node, and the user-defined policy is correlated to the policy created by the application and is for configuring at least one of a transport network function and a core network function.

4. The method as claimed in claim 1, wherein the RIC is the non-real-time (NRT) RIC and the application is an rApp hosted by the NRT RIC.

5. The method as claimed in claim 1, wherein the receiving the data comprises receiving real time performance and/or event data of the one or more network functions from an observability framework (OBF) of the SMO framework.

6. The method as claimed in claim 5, wherein the real time performance and/or event data comprises fault, configuration, accounting, performance and security (FCAPS) data from E2 RAN nodes and at least one of a transport network and a core network.

7. The method as claimed in claim 1, wherein the evaluating comprises determining the one or more policies to implement by performing analysis, computations, enrichment and evaluation with respect to the at least one policy and the received data.

8. The method as claimed in claim 1, wherein the controlling to implement the one or more policies comprises triggering a life cycle management workflow in an orchestrator of the SMO framework, to trigger a configuration manager to implement the one or more policies on at least the RAN.

9. An apparatus for implementing a centralized policy engine within a Service Management and Orchestration (SMO) framework of a telecommunications network, the apparatus comprising:

a memory storing instructions; and at least one processor within the SMO framework and distinct from a radio access network (RAN) Intelligent Controller (RIC) in the SMO framework and from a Near-Real-Time RIC, the at least one processor configured to execute the instructions to:

receive at least one policy, the at least one policy comprising a policy created by an application hosted in the RIC;

receive data of one or more network functions, the data comprising at least one of performance data and event data of the one or more network functions;

evaluate the at least one policy based on the received data; and control to implement one or more of the at least one policy in at least a RAN, based on the evaluating.

10. The apparatus as claimed in claim 9, wherein the at least one policy further comprises a user-defined policy input to the centralized policy engine via a user interface.

11. The apparatus as claimed in claim 10, wherein the policy created by the application is for configuring at least one RAN node, and the user-defined policy is correlated to the policy created by the application and is for configuring at least one of a transport network function and a core network function.

12. The apparatus as claimed in claim 9, wherein the RIC is a non-real-time (NRT) RIC and the application is an rApp hosted by the NRT RIC.

13. The apparatus as claimed in claim 9, wherein the at least one processor is configured to execute the instructions to receive real time performance and/or event data of the one or more network functions from an observability framework (OBF) of the SMO framework.

14. The apparatus as claimed in claim 13, wherein the real time performance and/or event data comprises fault, configuration, accounting, performance and security (FCAPS) data from E2 RAN nodes and at least one of a transport network and a core network.

15. The apparatus as claimed in claim 9, wherein the at least one processor is configured to execute the instructions to determine the one or more policies to implement by performing analysis, computations, enrichment and evaluation with respect to the at least one policy and the received data.

16. The apparatus as claimed in claim 9, wherein the at least one processor is configured to execute the instructions to control to implement the one or more policies by triggering a life cycle management workflow in an orchestrator of the SMO framework, to trigger a configuration manager to implement the one or more policies on at least the RAN.

17. A non-transitory computer-readable recording medium having recorded thereon instructions executable by at least one processor, of a centralized policy engine within a Service Management and Orchestration (SMO) framework of a telecommunications network, to perform a method of managing policies, the method comprising:

receiving, by the centralized policy engine, at least one policy, the at least one policy comprising a policy created by an application hosted in a radio access network (RAN) Intelligent Controller (RIC), the centralized policy engine within the SMO framework being distinct from a Non-Real-Time RIC and a Near-Real-Time RIC;

receiving, by the centralized policy engine, data of one or more network functions, the data comprising at least one of performance data and event data of the one or more network functions;

evaluating the at least one policy based on the received data; and controlling to implement one or more of the at least one policy in at least a RAN, based on the evaluation.

18. The non-transitory computer-readable recording medium as claimed in claim 17, wherein:

the at least one policy further comprises a user-defined policy input to the centralized policy engine via a user interface;

the policy created by the application is for configuring at least one RAN node; and the user-defined policy is correlated to the policy created by the application and is for configuring at least one of a transport network function and a core network function.

19. The non-transitory computer-readable recording medium as claimed in claim 17, wherein the receiving the data comprises receiving real time performance and/or event data of the one or more network functions from an observability framework (OBF) of the SMO framework.

20. The non-transitory computer-readable recording medium as claimed in claim 17, wherein the controlling to implement the one or more policies comprises triggering a life cycle management workflow in an orchestrator of the SMO framework, to trigger a configuration manager to implement the one or more policies on at least the RAN.

\* \* \* \* \*